(12) United States Patent
Varghese et al.

(10) Patent No.: US 12,155,941 B2
(45) Date of Patent: Nov. 26, 2024

(54) OPTIMIZING HIGH DYNAMIC RANGE (HDR) IMAGE PROCESSING BASED ON SELECTED REGIONS

(71) Applicant: QUALCOMM Incorporated, San Diego, CA (US)

(72) Inventors: Nithin Varghese, Kerala (IN); Nitin Srivastava, Hyderabad (IN); Narendra Kumar Chepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/996,776

(22) PCT Filed: Dec. 14, 2020

(86) PCT No.: PCT/US2020/064957
§ 371 (c)(1),
(2) Date: Oct. 20, 2022

(87) PCT Pub. No.: WO2021/230914
PCT Pub. Date: Nov. 18, 2021

(65) Prior Publication Data
US 2023/0171509 A1    Jun. 1, 2023

(30) Foreign Application Priority Data
May 11, 2020    (IN) .............................. 202041019746

(51) Int. Cl.
*H04N 23/741* (2023.01)
*H04N 5/265* (2006.01)
(Continued)

(52) U.S. Cl.
CPC ........... *H04N 23/741* (2023.01); *H04N 5/265* (2013.01); *H04N 23/611* (2023.01); *H04N 23/62* (2023.01);
(Continued)

(58) Field of Classification Search
CPC .... H04N 23/741; H04N 5/265; H04N 23/611; H04N 23/62; H04N 23/632; H04N 23/72;
(Continued)

(56) References Cited

U.S. PATENT DOCUMENTS

| 10,264,193 B2 | 4/2019 | Schaefer |
| 2011/0292242 A1* | 12/2011 | Imai ..................... H04N 23/633 |
| | | 348/E5.037 |

(Continued)

OTHER PUBLICATIONS

International Search Report and Written Opinion—PCT/US2020/064957—ISA/EPO—Feb. 23, 2021.

*Primary Examiner* — Ahmed A Berhan
(74) *Attorney, Agent, or Firm* — QUALCOMM Incorporated

(57) ABSTRACT

Multiple regions of a scene are identified, for example through user inputs to a touchscreen while the touchscreen displays preview frames of the scene. Multiple exposure settings are determined based on the identified regions. Each exposure setting is determined based on one of the identified regions, for instance to optimally expose that region. Multiple image frames are captured of the scene, with each image frame captured at a different one of the determined exposure settings. A high dynamic range (HDR) image of the scene is generated by merging the multiple image frames of the scene.

30 Claims, 6 Drawing Sheets

(51) Int. Cl.
  *H04N 23/611* (2023.01)
  *H04N 23/62* (2023.01)
  *H04N 23/63* (2023.01)
  *H04N 23/72* (2023.01)
  *H04N 23/73* (2023.01)
  *H04N 23/743* (2023.01)

(52) U.S. Cl.
  CPC ........... *H04N 23/632* (2023.01); *H04N 23/72* (2023.01); *H04N 23/73* (2023.01); *H04N 23/743* (2023.01)

(58) Field of Classification Search
  CPC ........ H04N 23/73; H04N 23/743; G06T 5/92; G06T 2207/10004; G06T 2207/10144; G06T 2207/20104; G06T 2207/20208; G06T 2207/20221; G06T 2207/30201; G06T 5/50
  See application file for complete search history.

(56) References Cited

U.S. PATENT DOCUMENTS

2017/0324909 A1* 11/2017 Choi ..................... H04N 23/74
2018/0288311 A1* 10/2018 Baghert ................. H04N 5/265
2019/0222769 A1    7/2019 Srivastava et al.

* cited by examiner

OPTIMIZING HIGH DYNAMIC RANGE (HDR) IMAGE PROCESSING BASED ON SELECTED REGIONS

FIELD

This application is related to image processing. More specifically, this application relates to systems and methods of performing high dynamic range (HDR) image processing by merging multiple image frames of a scene that are each captured at different exposures, with the different exposures based on different regions of the scene.

BACKGROUND

The dynamic range of a digital image device, such as a digital camera, is the ratio between the largest amount of light that the device can capture without saturation, and the lowest amount of light the device can accurately measure and distinguish from intrinsic image noise (electrical, thermal, etc.). Most digital cameras are able to capture only a small portion of the natural illumination range of a real-world scene. The dynamic range of a scene may be, for example, 100,000:1, while the dynamic range of the image sensor of the digital camera may be, for example, 100:1. When the dynamic range of the scene exceeds the dynamic range of the sensor, details in the regions of highest light levels and lowest light levels are lost.

SUMMARY

High dynamic range (HDR) imaging can be improved by allowing a user or computing system to identify important regions in a scene that are prioritized in generating an HDR image of the scene. Image processing techniques and technologies are described herein for identifying regions of a scene that are important, determining exposure settings based on those specific regions, and merging together image frames captured at those exposure settings to generate a HDR image that optimally reproduces all of those regions.

In one example, a method of processing image data is provided. The method includes identifying a first region of a scene and determining a first exposure setting based on the first region of the scene. The method also includes identifying a second region of the scene and determining a second exposure setting based on the second region of the scene. The method also includes receiving a first image frame of the scene that is captured using the first exposure setting and receiving a second image frame of the scene that is captured using the second exposure setting. The method also includes generating a high dynamic range (HDR) image of the scene by merging at least the first image frame and the second image frame.

In another example, an apparatus for processing image data is provided. The apparatus includes a connector that is coupled to an image sensor. The connector receives a first image frame of a scene that is captured using a first exposure setting and receives a second image frame of the scene that is captured using a second exposure setting. The apparatus also includes one or more memory units storing instructions and one or more processors that execute the instructions. Execution of the instructions by the one or more processors causes the one or more processors to perform operations. The operations include identifying a first region of a scene and determining a first exposure setting based on the first region of the scene. The operations also include identifying a second region of the scene and determining a second exposure setting based on the second region of the scene. The operations also include generating a high dynamic range (HDR) image of the scene by merging at least the first image frame and the second image frame.

In another example, a non-transitory computer-readable medium is provided that has stored thereon instructions that, when executed by one or more processors, cause the one or more processors to: identify a first region of a scene; determine a first exposure setting based on the first region of the scene; identify a second region of the scene; determine a second exposure setting based on the second region of the scene; receive a first image frame of the scene that is captured using the first exposure setting; receive a second image frame of the scene that is captured using the second exposure setting; and generate a high dynamic range (HDR) image of the scene by merging at least the first image frame and the second image frame.

In another example, an apparatus for processing image data is provided. The apparatus includes: means for identifying a first region of a scene; means for determining a first exposure setting based on the first region of the scene; means for identifying a second region of the scene; means for determining a second exposure setting based on the second region of the scene; means for receiving a first image frame of the scene that is captured using the first exposure setting; means for receiving a second image frame of the scene that is captured using the second exposure setting; and means for generating a high dynamic range (HDR) image of the scene by merging at least the first image frame and the second image frame.

In some aspects, the methods, apparatuses, and computer-readable medium described above further comprise: receiving one or more touch-based inputs through a touchscreen while the touchscreen displays one or more preview frames of the scene, wherein identifying the first region and the second region is based on the one or more touch-based inputs.

In some aspects, the methods, apparatuses, and computer-readable medium described above further comprise: receiving one or more pointer-based inputs through an input device that controls a pointer on a screen while the screen displays one or more preview frames of the scene, wherein identifying the first region and the second region is based on the one or more pointer-based inputs.

In some aspects, the methods, apparatuses, and computer-readable medium described above further comprise: identifying an object in the scene using an object detection algorithm, wherein identifying the first region of the scene is based on identifying that the object is within the first region. In some examples, the object is a face.

In some aspects, the methods, apparatuses, and computer-readable medium described above further comprise: identifying a third region of the scene; determining a third exposure setting based on a third region of the scene; and receiving a third image frame of the scene captured using the third exposure setting, wherein generating the HDR image of the scene includes merging at least the first image frame and the second image frame and the third image frame.

In some aspects, the methods, apparatuses, and computer-readable medium described above further comprise: the first exposure setting corresponds to a first exposure time and the second exposure setting corresponds to a second exposure time that is different from the first exposure time.

In some aspects, a mid-tone of the first region in the scene matches a mid-tone of a representation of the first region in the first image frame within a first threshold. In some cases, a mid-tone of the second region in the scene matches a mid-tone of a representation of the first region in the second image frame within a second threshold.

In some aspects, the first region is reproduced in the second image frame at a second contrast level and in the first image frame at a first contrast level that exceeds the second contrast level.

In some aspects, the second region is reproduced in the first image frame at a first contrast level and in the second image frame at a second contrast level that exceeds the first contrast level.

In some aspects, a third dynamic range of the HDR image is greater than at least one of a first dynamic range of the first image frame and a second dynamic range of the second image frame.

In some aspects, the first region includes all pixels of the first image frame.

In some aspects, the methods, apparatuses, and computer-readable medium described above further comprise: determining a third exposure setting and a fourth exposure setting using exposure bracketing based on the first exposure setting; receiving a third image frame of the scene captured using the third exposure setting; and receiving a fourth image frame of the scene captured using the fourth exposure setting, wherein generating the HDR image of the scene includes merging at least the first image frame and the second image frame and the third image frame and the fourth image frame.

In some aspects, the methods, apparatuses, and computer-readable medium described above further comprise: determining a third exposure setting that is offset from the first exposure setting by a predetermined offset; and receiving a third image frame of the scene captured using the third exposure setting, wherein generating the HDR image of the scene includes merging at least the first image frame and the second image frame and the third image frame.

In some aspects, the methods, apparatuses, and computer-readable medium described above further comprise: capturing the first image frame of the scene using the first exposure setting; and capturing the second image frame of the scene using the second exposure setting.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
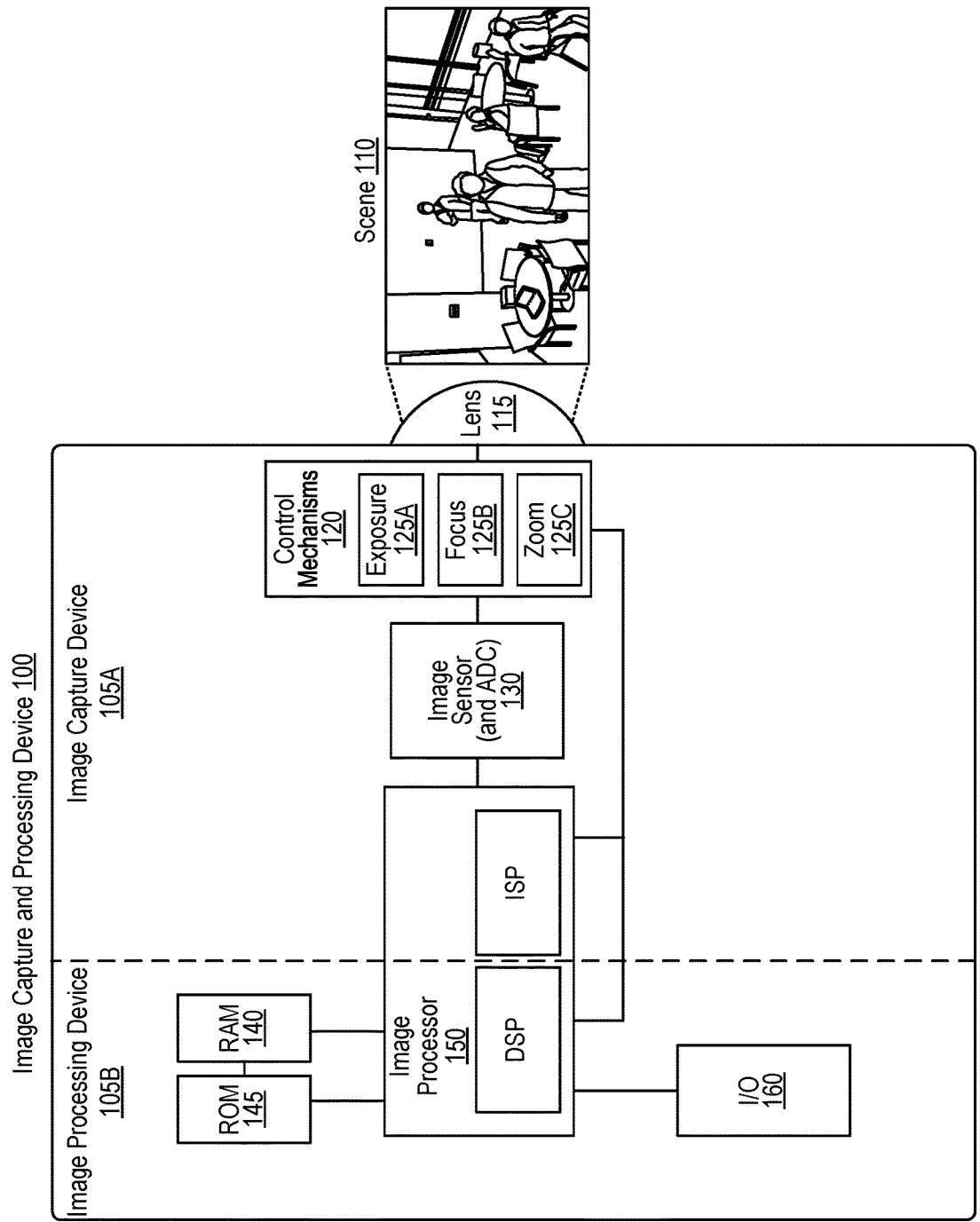
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

High-dynamic-range imaging (HDRI) is a high dynamic range (HDR) technique used in imaging and photography. A camera performing HDRI generally captures two or more image frames of the same scene at different exposure settings, and then merges these image frames into a single HDR image. The HDR image generally has a higher dynamic range than any of the image frames that were merged to produce the HDR image.

Low exposures limit the amount of light that reaches the image sensor. Thus, image frames captured at low exposures and are generally able to accurately reproduce details in very bright regions of a scene, such as regions of a scene depicting the sun, a lamp, a screen, or another light source. High exposures, on the other hand, allow more light to reach the image sensor. Image frames captured at high exposures, then, are generally able to accurately reproduce details in very dim regions of a scene, such as regions that are shrouded in shadows. An HDR image that is generated by merging an image frame captured at a low exposure with an image frame captured at a high exposure can accurately reproduce details in both very bright and very dim regions, and thus reproduces a greater dynamic range of luminosity than image frames captured at any single exposure.

Exposure times of the image frames to be merged in the HDRI process may, in some cases, be selected through a process known as exposure bracketing. In exposure bracketing, a "main" exposure is selected and is denoted as exposure value (EV) 0. The "main" exposure may be selected, for instance, based on an auto-exposure (AE)

control, which may try incremental adjustments to exposure settings until one is found that produces a representation of the scene in which a mid-tone of the representation of the scene matches a mid-tone of the actual scene as closely as possible (e.g., within a threshold). A predetermined offset EV is selected, such as N stops. A lower exposure is selected that is lower than EV 0 by the offset EV. For example, if the offset is N stops, this lower exposure is denoted as EV −N. A higher exposure is selected that is higher than EV 0 by the offset EV. For example, if the offset is N stops, this higher exposure is denoted as EV+N. The HDR image is generated by merging an image frame captured at EV 0, an image frame captured at EV −N, and an image frame captured at EV+N. Here, N may be any value, such as 0.5, 1.0, 1.5, 2.0, 2.5, 3.0, 3.5, 4.0, 4.5, 5.0, a number between 0 and 0.5, a number greater than 5.0, or a number in between any two previously listed numbers.

Exposure bracketing has its limitations, however. If region of the scene is poorly exposed all three of the image frames (e.g., EV 0, EV −N, and EV +N), then that region will still be poorly exposed in the resulting HDR image. A user using an image capture and processing device that captures image frames for merging into an HDR image and selects the exposure settings for those image frames through exposure bracketing has no way to ensure that specific regions of a scene that are important to the user, such as faces or regions with written text, are properly exposed in the HDR image.

In some cases, the image frames that are eventually combined to form the HDR image may be captured at exposure settings that are selected based on specific regions of the scene. These regions may be identified by an image capture and processing device based on user inputs (e.g., selecting an object within the region or one or more corners or edges of the region), one or more object recognition algorithms (e.g., automatically recognizing human faces or other important objects within a scene), or some combination thereof. Exposure settings may be generated based on the identified regions of the scene, with the exposure setting that corresponds to each region generated to optimize exposure for that region. For instance, an exposure setting with a long exposure time may be generated to correspond to a region that is dimly lit in order to capture enough light to make details within the dimly lit region clear, while an exposure setting with a short exposure time may be generated to correspond to a region that is brightly lit in order to limit light intake to make details within the brightly lit region clear. An HDR image that is generated by merging image frames that are captured with these exposure settings that correspond to specific regions in the scene includes optimal levels of detail within those regions. In some cases, a combination of region-focused exposure settings and exposure bracketing may be used.

FIG. 1 is a block diagram illustrating an architecture of an image capture and processing device. The image capture and processing device 100 of FIG. 1 includes various components that the image capture and processing device 100 uses to capture and process an image of a scene 110. A lens 115 of the device 100 faces a scene 110 and receives light from the scene 110 and bends the light toward the image sensor 130. The light received by the lens 115 passes through an aperture controlled by one or more control mechanisms 120 and is received by an image sensor 130. The one or more control mechanisms 120 may control exposure, focus, and/or zoom based on information from the image sensor 130 and/or from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C.

The focus control mechanism 125B of the control mechanisms 120 stores a focus setting in a memory register, and based on this focus setting, adjusts the position of the lens 115 relative to the position of the image sensor 130, in some cases moving the lens 115 closer to the image sensor 130 or farther from the image sensor 130 by actuating a motor or servo, thereby adjusting focus. In some cases, additional lenses may be included in the device 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150.

The exposure control mechanism 125A of the control mechanisms 120 stores an exposure setting in a memory register, and based on this exposure setting, the exposure control mechanism 125A controls a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or some combination thereof. For HDR photography, aperture size is in some cases unchanged, as changes to aperture size may in some cases change depth of field, which could cause certain areas that are clear in one image frame to be blurry in another or vice versa, potentially preventing image frames captured at different aperture sizes from being cleanly merged together into an HDR image in such scenarios. Changes to exposure time, ISO speed, and analog gain generally do not affect depth of field, and therefore may be used more effectively for capturing image frames that are eventually merged generated a HDR image.

The zoom control mechanism 125C of the control mechanisms 120 stores a zoom setting in a memory register. Based on this zoom setting, the zoom control mechanism 125C controls a focal length of an assembly of lens elements (lens assembly) that includes the lens 115 and one or more additional lenses by actuating one or more motors or servos to move one or more of the lenses relative to one another. The lens assembly may include a parfocal zoom lens or a varifocal zoom lens. The lens assembly may include a focusing lens 115 that receives the light from the scene 110 first, then an afocal zoom system between the focusing lens 115 and the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements, each photodiode measuring an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked), the different photodiodes having different spectral sensitivity curves and therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs), one or more digital signal processors (DSPs), and/or one or more of any other type of processor 610 discussed with respect to the computing system 600. The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/620, read-only memory (ROM) 145/625, a cache 612, a memory unit 615, another storage device 630, or some combination thereof.

Various input/output (I/O) devices 160 may be connected to the image processor 150, such as a display screen, a keyboard, a keypad, a touchscreen, a trackpad, a touch-sensitive surface, any other output devices 635, any other input devices 645, or some combination thereof. In some cases, regions of a scene may be identified based on inputs received from a user by one or more of the I/O devices 160 and conveyed to the image processor 150. The I/O 160 may include one or more ports, jacks, or other connectors that enable a wired connection between the device 100 and one or more peripheral devices, over which the device 100 may receive data from the one or more peripheral device and/or transmit data to the one or more peripheral devices. The I/O 160 may include one or more wireless transceivers that enable a wireless connection between the device 100 and one or more peripheral devices, over which the device 100 may receive data from the one or more peripheral device and/or transmit data to the one or more peripheral devices.

In some cases, the image capture and processing device 100 may be a single device. In some cases, the image capture and processing device 100 may actually be two separate devices—an image capture device 105A (e.g., a camera) and an image processing device 105B (e.g., a computing device coupled to the camera). The image capture device 105A and the image processing device 105B may be coupled together, for example via one or more wires or cables, or wirelessly. The image capture device 105A and the image processing device 105B may be disconnected from one another. A vertical dashed line divides the image capture and processing device 100 of FIG. 1 into two portions, the two portions representing the image capture device 105A and the image processing device 105B, respectively. The image capture device 105A includes the lens 115, control mechanisms 120, image sensor 130, and a portion of the image processor 150 (including the ISP). The image processing device 105B includes a second portion of the image processor 150 (including the DSP), the RAM 140, the ROM 145, and the I/O 160. In some cases, certain components illustrated in the image capture device 105A, such as the ISP, may be included in the image processing device 105B. In some cases certain components illustrated in the image processing device 105B, such as the DSP, may be included in the image capture device 105A.

The image capture and processing device 100 of FIG. 1 may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing device 100 may include one or more wireless transceivers for wireless communications.

While the image capture and processing device 100 is shown to include certain components, one of ordinary skill will appreciate that the image capture and processing device 100 can include more components than those shown in FIG. 1. The components of the image capture and processing device 100 can include software, hardware, or one or more combinations of software and hardware. For example, in some implementations, the components of the image capture and processing device 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing device 100.

Figure 2:
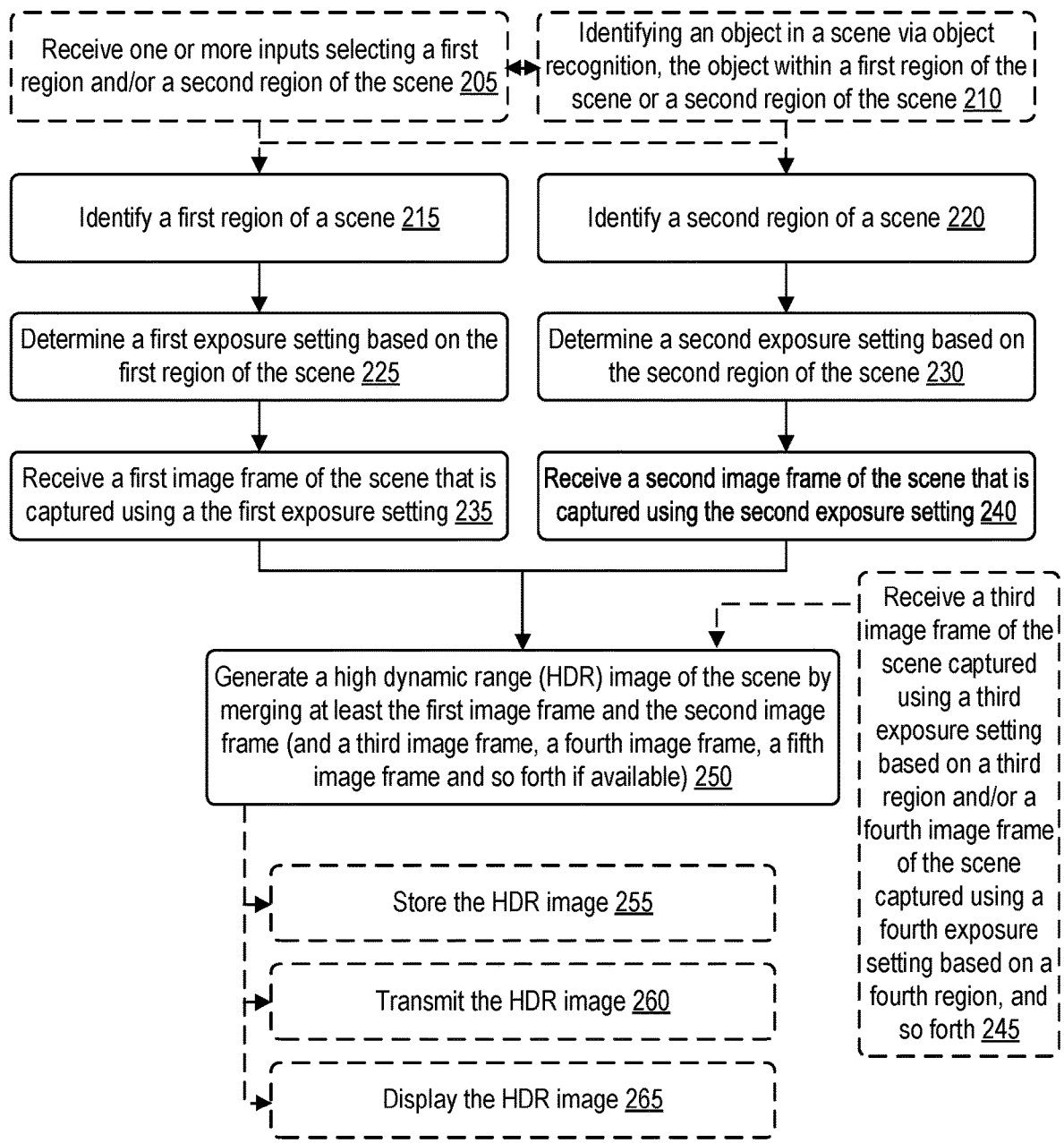
FIG. 2 is a flow diagram illustrating operations for image processing to generate a high dynamic range (HDR) image.

FIG. 2 is a flow diagram illustrating operations for image processing to generate a high dynamic range (HDR) image. The image processing operations 200 of FIG. 2 may be performed by the image capture and processing device 100 or the image processing device 105B of FIG. 1. For simplicity, the operations 200 of FIG. 2 will be discussed as being performed by the image processing device 105B.

At operation 215, the image processing device 105B identifies a first region of a scene. At operation 220, the image processing device 105B identifies a second region of the scene. In some cases, the identification of the first region and second region in operations 220 may be based on operation 205 and/or operation 210.

At operation 205, the image processing device 105B receives one or more inputs selecting the first region of the scene and/or the second region of the scene. In one example, the one or more inputs may include touch-based inputs received through a touchscreen of the I/O 160 of the image processing device 105B while the touchscreen displays one or more preview frames of the scene. Preview frames can also be referred to herein as preview images. Alternately or additionally, the one or more inputs may include one or more pointer-based inputs received through an input device of the I/O 160 of the image processing device 105B that controls a pointer on a screen (e.g., a mouse or trackpad or keyboard or keypad) while the screen displays one or more preview frames of the scene.

For instance, a user may touch or click an object to define a region that includes the object. In response to receiving the touch or click on the object from the touchscreen or input device, the image processing device 105B can determine the boundaries of the region by identifying the boundaries of the object via edge detection, feature detection, object detection, object recognition, or some combination thereof. In another example, a user may touch or click an intended center of a region, and the image processing device 105B can define a region of a pre-defined size around the location of the touch or click input that the image processing device 105B receives from the touchscreen or input device. In another example, the user may touch one or more corners or edges of a region to define the area spanned by the region, and the image processing device 105B can define a region based on the corners or edges indicated by the touch or click inputs received by the image processing device 105B from the touchscreen or input device. In another example, the user may touch or click a corner of a region and swipe or drag to an opposite corner of the region before releasing the touch or click, and the image processing device 105B can define the area spanned by the region being a rectangle having the two corners indicated by the touch or pointer inputs received by the image processing device 105B from the touchscreen or input device. In another example, the user may touch, click, drag, and/or swipe their finger or pointer into one or more boxes (e.g. squares or oblong rectangles) of a grid overlaid over the scene on the touchscreen, and the image processing device 105B can identify a region that includes those boxes of the grid that are indicated by the touch or pointer inputs received by the image processing device 105B from the touchscreen or input device. In another example, a user may draw a shape on the touchscreen via touch or on the screen via the pointer, and the image processing device 105B can define a region to include the area of the scene within the shape that is drawn using the touch or pointer inputs received by the image processing device 105B from the touchscreen or input device. While touch-based inputs and pointer-based inputs are used herein as an illustrative example, any type of input can be used, such as pointer-based input, gesture-based input, voice- or speech-based input, any combination of inputs (e.g., a combination of touch- and voice-based input, etc.), and/or other type of input.

In some cases, the first region and/or the second region may be identified based on identifying an object in the scene via an object detection or object recognition algorithm. If an object is identified by the object detection or object recognition algorithm, a region may be identified by the image processing device 105B to include that object as detected by the image processing device 105B. In some cases, the object may be a face of a human being or of an animal (e.g., a pet). In some case, the object may be a sign, a document, a screen, a projection surface, or another area that includes text and/or numbers printed, written, displayed, or projected thereon. In some cases, the object may be a vehicle, a computer, or another mechanical and/or electronic device. In some cases, the object may be an animal, a plant, or another natural object. In some cases, the object may be a particularly brightly-lit object or area relative to the rest of the scene (e.g., the average luminance of the object or area having being higher than the average luminance of the scene by a threshold, for instance by a standard deviation or multiple thereof). In such cases, the object can be selected so that the HDR image ultimately represents the brightly-lit object or area optimally due to the image frame corresponding to the region with the object being captured with an optimal exposure setting for that object. In some cases, the object may be a particularly dimly-lit object or area in the scene (e.g., the average luminance of the object or area having being lower than the average luminance of the scene by a threshold, for instance by a standard deviation or multiple thereof). In such cases, the object can be selected so that the HDR image ultimately represents that dimly-lit object or area optimally due to the image frame corresponding to the region with the object being captured with an optimal exposure setting for that object. The object may thus include a particular area of floor, wall, ceiling, a roof, an edge, a corner, a piece of furniture, a window, a door, an area of sky, an area in nature, or some combination thereof. The boundaries of the region may be identified to be the boundaries of the object, or boundaries having a particular pre-determined shape (e.g., square, oblong rectangular, circular, oval) that contains the object, that contains whatever portion of the object is visible in the image frame(s) in question, or that contains a part of the object that includes the highest concentration of edges or other features.

The object detection and/or recognition algorithm applied by the image processing device 105B may include and/or incorporate an image detection and/or recognition algorithm, an object detection and/or recognition algorithm, a facial detection and/or recognition algorithm, a feature detection and/or recognition algorithm, an edge detection algorithm, a boundary tracing function, or some combination thereof. Object detection is a technology used to detect (or locate) objects from an image or video frame. Detected objects can be represented using bounding regions that identify the location and/or approximate boundaries of the object (e.g., a face) in the image or video frame. A bounding region of a detected object can include a bounding box, a bounding circle, a bounding ellipse, a bounding polygon, or any other suitably-shaped region representing and/or including a detected object. Object detection and/or recognition can be used to identify a detected object and/or to recognize and classify the detected object into a category or type of object. For instance, feature recognition may identify a number of edges and corners in an area of the scene. Object detection may detect that the detected edges and corners in the area all belong to a single object. Object detection and/or object recognition and/or face detection may identify that the object is a human face. Object recognition and/or face recognition may further identify the identity of the person corresponding to that face.

The object detection and/or recognition algorithm can be performed using any suitable object recognition and/or detection technique. In some implementations, the object detection and/or recognition algorithm can be based on a machine learning model trained using a machine learning algorithm on images of the same types of objects and/or features that may extract features of the image and detect and/or classify the object comprising those features based on the training of the model by the algorithm. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, a deep learning algorithm, or some combination thereof.

In some implementations, a computer vision-based object detection and/or recognition technique can be used. Different types of computer vision-based object detection algorithms can be used. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a face (or other object) window or a non-face window effectively with a cascaded classifier. A cascaded classifier includes multiple classifiers combined in a cascade, which allows background regions of the image to be quickly discarded while performing more computation on object-like regions. Using a face as an example of a body part of an external observer, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a hand (or other object). After all the windows are detected, a non-max suppression algorithm can be used to group the windows around each face to generate the final result of one or more detected faces.

At operation 225, the image processing device 105B determines a first exposure setting based on the first region of the scene. At operation 230, the image processing device 105B determines a second exposure setting based on the second region of the scene. At operation 235, the image processing device 105B receives a first image frame of the scene captured using the first exposure setting. Operation 235 may, in some cases, also include the image capture device 105A capturing the first image frame of the scene using the first exposure setting. At operation 240, the image processing device 105B captures a second image frame of the scene using the second exposure setting. Operation 240 may, in some cases, also include the image capture device 105A capturing the second image frame of the scene using the second exposure setting.

In some cases, the first exposure setting corresponds to a first exposure time and the second exposure setting corresponds to a second exposure time that is different from the first exposure time. In some cases, the first region is optimally exposed in the first image frame, and the second region is optimally exposed in the second image frame. In some cases, a mid-tone of the first region in the scene matches a mid-tone of a representation of the first region in the first image frame within a first threshold, and a mid-tone of the second region in the scene matches a mid-tone of a representation of the first region in the second image frame within a second threshold.

In some cases, the first region is reproduced in the second image frame at a second contrast level and in the first image frame at a first contrast level that exceeds the second contrast level. In some cases, the second region is reproduced in the first image frame at a first contrast level and in the second image frame at a second contrast level that exceeds the first contrast level.

At operation 250, the image processing device 105B generates a high dynamic range (HDR) image of the scene by merging at least the first image frame and the second image frame. In some cases, the dynamic range of the HDR image is greater than a first dynamic range of the first image frame and/or than a second dynamic range of the second image frame.

Generating the HDR image based on identified regions as in the operations 200 allows the image processing device 105B to ensure that the identified regions are optimally and clearly reproduced in the HDR image, based on each of those regions being optimally exposed in at least one of the image frames that are ultimately merged together to generate the HDR image. On the other hand, important regions of an HDR image that is generated based on exposure bracketing can still appear overexposed, underexposed, or otherwise unclear, in some cases leaving faces in the HDR image unrecognizable and text in the HDR image unreadable. For instance, if none of the three exposures selected via exposure bracketing (EV 0, EV –N, EV +N) provide an optimal exposure for a particular region, that region may appear overexposed, underexposed, or otherwise unclear in all three image frames captured using exposure bracketing, and the region will remain unclear (e.g., still appearing overexposed or underexposed) in the resulting HDR image. Generating the HDR image based on identified regions as in the operations overcomes this technical limitations of exposure bracketing, ultimately improving image capture devices and image processing devices to produce HDR images that are superior in that important regions with faces or blocks of text or other important objects do not appear underexposed, overexposed, or otherwise unclear.

In some cases, at operation 245, the image processing device 105B may receive a third image frame of the scene captured using a third exposure setting based on a third region, and may generate the HDR image based on the third image frame in addition to the first and second image frames. Operation 245 may, in some cases, also include the image capture device 105A capturing the third image frame of the scene using the third exposure setting. At operation 245, the image processing device 105B may also receive a fourth image frame, a fifth image frame, and so forth, with each respective image frame captured using a respective exposure setting based on a respective region. Any number of regions may be identified, based upon which an exposure settings may be determined and used to capture additional image frames to be merged with the other image frames to generate the HDR image. In some cases, one of the first region, the second region, a third region, or another region is a region that includes the entire scene.

In some cases, operation 250 may be followed by operation 255, in which the image processing device 105B stores the device in a non-transitory computer-readable storage medium, such as a hard drive, an optical disk, flash memory, RAM 145/625, ROM 140/620, a removable storage device, a secure digital (SD) card, a mini secure digital (SD) card, a micro secure digital (SD) card, another type of memory 615 or storage device 630, or some combination thereof.

In some cases, operation 250 may be followed by operation 260, in which the image processing device 105B transmits the HDR image to a second device using a transmitter or a transceiver. The transmission may occur over a wired connection, a wireless connection, or some combination thereof. The transmission may in some cases occur over a network, such as a cellular network, a local area network (LAN), a wireless local area network (WLAN), the Internet, or some combination thereof.

In some cases, operation 250 may be followed by operation 265, in which the image processing device 105B displays the HDR image on a screen or projector. The screen or projector may be part of the image processing device 105B or may be coupled to the image processing device 105B. The screen or projector may be part of the second device that the image processing device 105B transmits the HDR image to via the operation 260.

In some cases, the image processing device 105B determines a third exposure setting and a fourth exposure setting using exposure bracketing based on the first exposure setting. For instance, if the first exposure setting is indicated as EV 0, then the third exposure setting may be lower than the first exposure setting by an offset value N (EV −N), and the fourth exposure setting may be higher than the first exposure setting by an offset value N (EV +N). The image processing device 105B may capture a third image frame of the scene using the third exposure setting and a capture a fourth image frame of the scene using the fourth exposure setting. In this case, generating the HDR image of the scene includes merging at least the first image frame and the second image frame and the third image frame and the fourth image frame. In effect, this technique combines exposure-bracketing-based HDR with the region-based HDR of the operations 200. In one example, the first region includes the entire scene, and therefore the first exposure setting is based on the entire scene.

In some cases, the image processing device 105B determines a third exposure setting that is offset from the first exposure setting (EV 0) by a predetermined offset value N. That is, the third exposure setting is either lower than the first exposure setting by the offset N (EV −N) or higher than the first exposure setting by the offset N (EV +N). The image processing device 105B captures a third image frame of the scene using the third exposure setting. In this case, generating the HDR image of the scene includes merging at least the first image frame and the second image frame and the third image frame.

In some cases, the operations 200 of FIG. 2 may be performed by an apparatus or system. The apparatus or system may be or include the image processing device 105B, the image capture device 105A, the image capture and processing device 100, or some combination thereof. The apparatus or system may be or include a mobile device, a mobile phone, a camera, a camcorder, a display device, a projector, or some combination thereof. The apparatus or system may be or include a computing system 600.

Figure 3A:
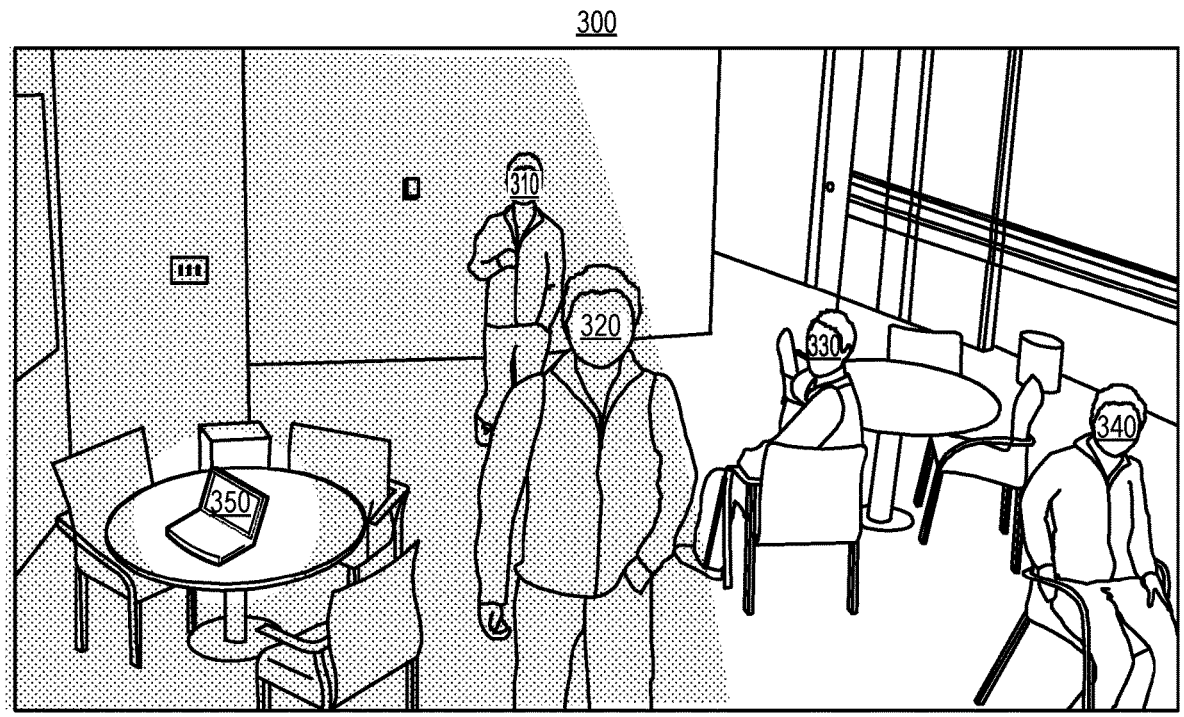
FIG. 3A is a conceptual diagram illustrating a preview frame of a scene.

FIG. 3A illustrates a preview frame of a scene. While the operations described with respect to FIG. 3A (and FIG. 3B) are described with respect to the image processing device 105B, the operations may be performed by the image capture device 105A, the image capture and processing device 100, the computing system 600, or some combination thereof. With respect to the example of FIG. 3A and FIG. 3B, the image processing device 105B may include a touchscreen or other type of screen, which can display a preview frame. For example, if the image processing device 105B is part of a camera device or other image capture and processing device 100, the screen may display one or more preview frames of the scene before the user pushes the shutter button.

The particular preview frame 300 illustrated in FIG. 3A depicts a scene that includes four human figures whose faces are visible in the scene. The faces of the four figures are labeled as face 310, face 320, face 330, and face 340. The scene also illustrates a laptop computer 350. The scene illustrates a window on the right-hand side that illuminates the right-hand side of the scene, with the left-hand side of the scene comparatively dimly lit and shrouded in shadow. As a result, the faces 310 and 320 are dimly lit and shrouded in shadow and not very illuminated by light from the window, while the faces 330 and 340 are brightly lit and not shrouded in shadow and well illuminated by light from the window. The laptop computer 350, while in the shadow, also acts as its own light source, as the display screen of the laptop computer 350 is illuminated (e.g., backlit or frontlit). In some cases, contrasts between dimly-lit areas and brightly-lit areas are reproduced poorly using single exposures or traditional HDR techniques.

Figure 3B:
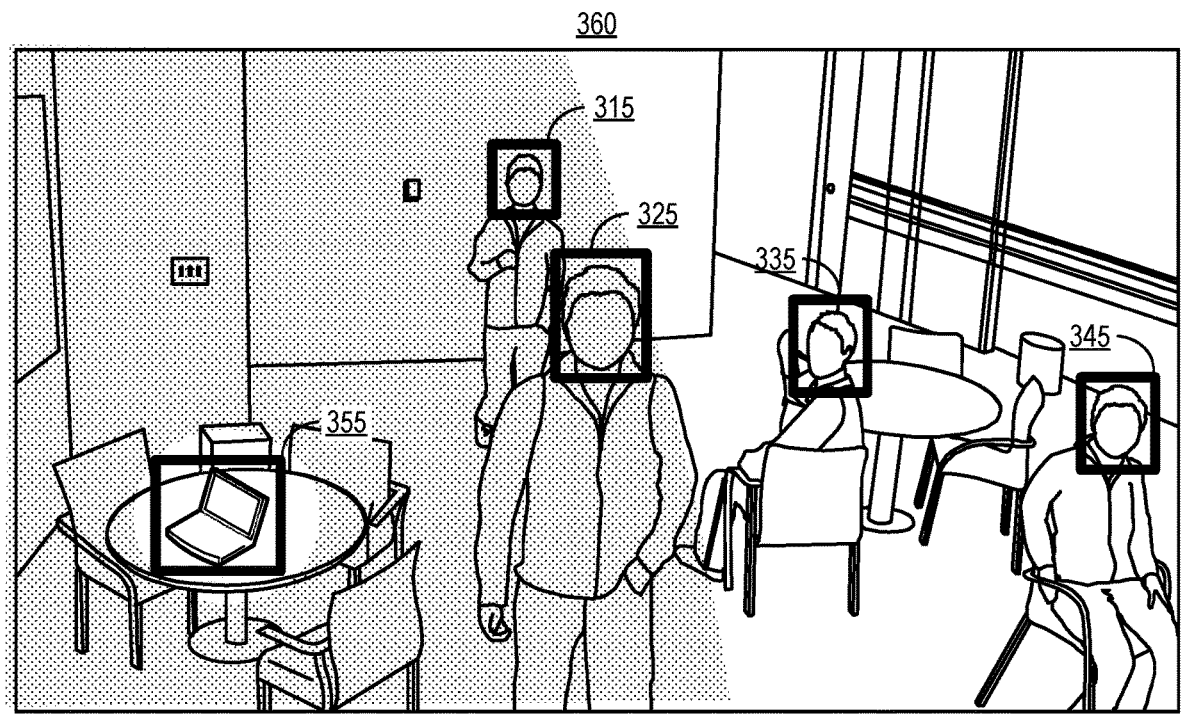
FIG. 3B is a conceptual diagram illustrating the preview frame of FIG. 3A with multiple regions identified.

FIG. 3B illustrates the preview frame of FIG. 3A with multiple regions identified. As shown, the preview frame 360 of FIG. 3B illustrates the same scene as the preview frame 300 of FIG. 3A, but with five rectangular regions being identified. In particular, a first region 315 is identified as a rectangle around the first face 310. A second region 325 is identified as a rectangle around the second face 320. A third region 335 is identified as a rectangle around the third face 330. A fourth region 345 is identified as a rectangle around the fourth face 340. A fifth region 355 is identified as a rectangle around the laptop computer 350.

In one exemplary scenario, the preview frame 300 of FIG. 3A may be displayed on a touchscreen or other screen of an image processing device 105B. A user may observe and touch or click each of the faces 310, 320, 330, and 340 in the scene, as well as the laptop computer 350 in the scene. As a result, the image processing device 105B may identify region 315 including the face 310, the region 325 including the face 320, the region 335 including the face 330, the region 345 including the face 340, and the region 355 including the laptop computer 350. In some cases, the image processing device 105B may use an object recognition algorithm to determine, based on each touch or click by the user, what object was touched or clicked on (e.g., a face 310/320/330/340 or a laptop computer 350), what the boundaries of that object are, and what region shape and size would best encompass that object.

The regions 315, 325, 335, 345, and 355 are all illustrated as rectangular, but may be any shape, including square, oblong rectangular, circular, oblong oval, any polygon, or any freehand-drawn shape, or some combination thereof. In some cases, the shape of a region may be drawn by a user using user inputs to an input device, for example drawn by touch by the user's finger or stylus on the touchscreen or by the mouse pointer using a mouse or trackpad. In some cases, the shape of a region may be indicated by a touch, drag, and release action, or a click, drag, and release action, with the touch or click indicating one corner of the rectangle and the release indicating a diagonally opposite corner of the rectangle. A touch/click, drag, and release action could alternately indicate the two endpoints points of a radius or diameter of a circle or oval that is then the region.

Once the five regions 315, 325, 335, 345, and 355 are identified, the image processing device 105B identifies different exposure settings corresponding to each of the five regions. The image processing device 105B may do so by performing an auto-exposure process specific to each region. The image processing device 105B may thus perform five auto-exposure process; one auto-exposure process specific to the pixels within the first region 315, one auto-exposure process specific to the pixels within the second region 325, one auto-exposure process specific to the pixels within the third region 335, one auto-exposure process specific to the pixels within the fourth region 345, and one auto-exposure process specific to the pixels within the fifth region 355. The resulting five exposure settings are each designed to optimally expose one of the five regions 315, 325, 335, 345, and 355. Optimally exposing a region increases the visibility (e.g., contrast) of details within the region, making such details clearer to a viewer of an image captured using such an optimal exposure setting.

Figure 4:
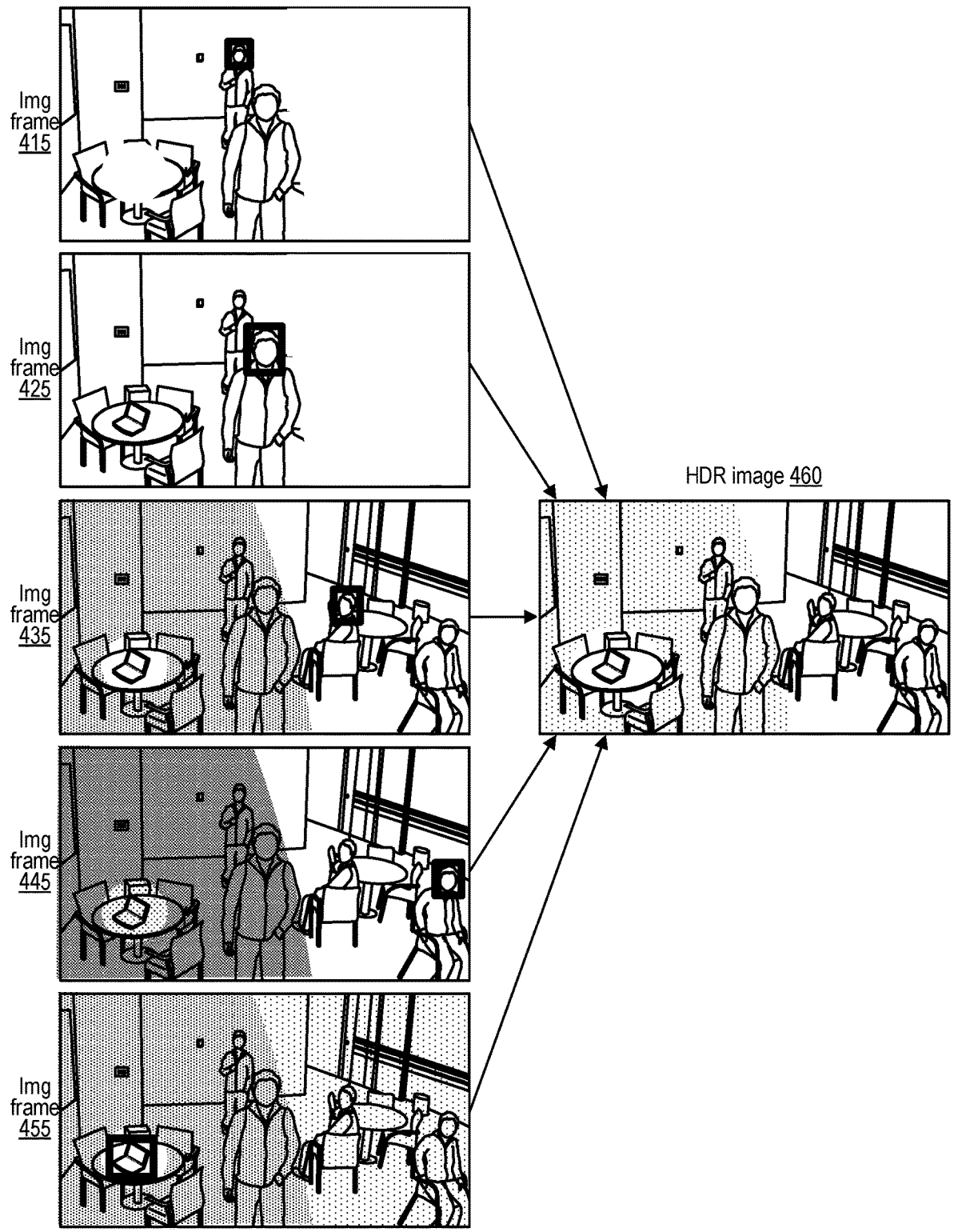
FIG. 4 is a diagram illustrating an operation merging a plurality of image frames into a single high dynamic range (HDR) image.

FIG. 4 illustrates an operation merging a plurality of image frames into a single high dynamic range (HDR) image. Five image frames 415, 425, 435, 445, and 455 of the scene of FIG. 3A and FIG. 3B are illustrated as having been captured in FIG. 4. The five image frames 415, 425, 435, 445, and 455 of the scene of FIG. 3A and FIG. 3B are captured using the exposure settings generated by the image processing device 105B for the five regions 315, 325, 335, 345, and 355 of FIG. 3B, respectively. For example, the first image frame 415 of FIG. 4 was captured using a first exposure setting that optimizes exposure for the first region 315 of FIG. 3B, the second image frame 425 of FIG. 4 was captured using a second exposure setting that optimizes exposure for the second region 325 of FIG. 3B, the third image frame 435 of FIG. 4 was captured using a third exposure setting that optimizes exposure for the third region 335 of FIG. 3B, the fourth image frame 445 of FIG. 4 was captured using a fourth exposure setting that optimizes exposure for the fourth region 345 of FIG. 3B, and the fifth image frame 455 of FIG. 4 was captured using a fifth exposure setting that optimizes exposure for the fifth region 355 of FIG. 3B. The rectangles identifying the five regions 315, 325, 335, 345, and 355 are also illustrated in the image frames 415, 425, 435, 445, and 455 of FIG. 4 to make it clear which image frame corresponds to which region. However, it should be understood that these region-identifying rectangles are illustrated within the image frames of FIG. 4 to make this correspondence easier to understand, and may be missing from the actual image frames 415, 425, 435, 445, and 455 as captured.

Because the first region 315 and the second region 325 are both in the dimly-lit area that appears on the left-hand side of the scene in the preview frame 300, the first exposure setting and the second exposure setting both use a long exposure time, a large aperture size, a fast ISO speed, a high analog and/or digital gain, or some combination thereof. As a result of the first exposure setting and the second exposure setting, the dimly-lit area that appears on the left-hand side of the scene in the preview frame 300 (that includes the first region 315 and the second region 325) appears clear and bright in the first image frame 415 and the second image frame 425. As a result of the first exposure setting and the second exposure setting, the brightly-lit area that appears on the right-hand side of the scene in the preview frame 300 (that includes the third region 335 and the fourth region 345) appears overexposed (e.g., overly bright and saturated with light) in the first image frame 415 and the second image frame 425. Likewise, the area of the scene that appears illuminated by the screen of the laptop computer 350 in the preview frame 300 (e.g., around the fifth region 355) also appears overexposed in the first image frame 415. However, because the second region 325 is slightly more illuminated than the first region 315, for instance because the second region 325 is closer to the window and to the laptop computer 350, the second exposure setting is slightly lower than the first exposure setting, and as a result, the area of the scene that appears illuminated by the screen of the laptop computer 350 in the preview frame 300 (e.g., around the fifth region 355) is slightly clearer and less overexposed in the second image frame 425 than the first image frame 415.

Because the third region 335 and the fourth region 345 are both in the brightly-lit area that appears on the right-hand side of the scene in the preview frame 300, the third exposure setting and the fourth exposure setting both use a short exposure time, a small aperture size, a slow ISO speed, a low (or no) analog and/or digital gain, or some combination thereof. As a result of the third exposure setting and the fourth exposure setting, the brightly-lit area that appears on the right-hand side of the scene in the preview frame 300 (that includes the third region 335 and the fourth region 345) appears clear in the third image frame 435 and the fourth image frame 445. As a result of the third exposure setting and the fourth exposure setting, the dimly-lit area that appears on the left-hand side of the scene in the preview frame 300 (that includes the first region 315 and the second region 325) appears very dark and dim in the third image frame 435 and the fourth image frame 445. Because the fourth region 345 is closer to the light source (the window) than the third region 335, the fourth exposure setting is even lower than the third exposure setting, so that even the area of the scene that appears illuminated by the screen of the laptop computer 350 in the preview frame 300 (that includes the fifth region 355) appears darkened in the fourth image frame 445, while it remains clear in the third image frame 435.

Because the fifth region 355 includes a laptop computer 350 with an illuminated screen that may include text or other important information displayed on the screen, the fifth exposure setting uses a short exposure time, a small aperture size, a slow ISO speed, a low (or no) analog and/or digital gain, or some combination thereof. As a result of the fifth exposure setting, the area of the scene that appears illuminated by the screen of the laptop computer 350 in the preview frame 300 (that includes the fifth region 355)

appears clear in the fifth image frame 455. Because of the fifth exposure setting, the brightly-lit area that appears on the right-hand side of the scene in the preview frame 300 (that includes the third region 335 and the fourth region 345) appears slightly dark and dim in the fifth image frame 455, and the dimly-lit area that appears on the left-hand side of the scene in the preview frame 300 (that includes the first region 315 and the second region 325) appears very dark and dim in the fifth image frame 455.

The first image frame 415, second image frame 425, third image frame 435, fourth image frame 445, and fifth image frame 455 are merged together into an HDR image 460. While some areas of the scene are still brighter or dimmer in the HDR image 460, all five of the regions 315, 325, 335, 345, and 355 appear clear, at high contrasts, and with all details (e.g., edges, corners, and other visual features) easily discernable.

Figure 5:
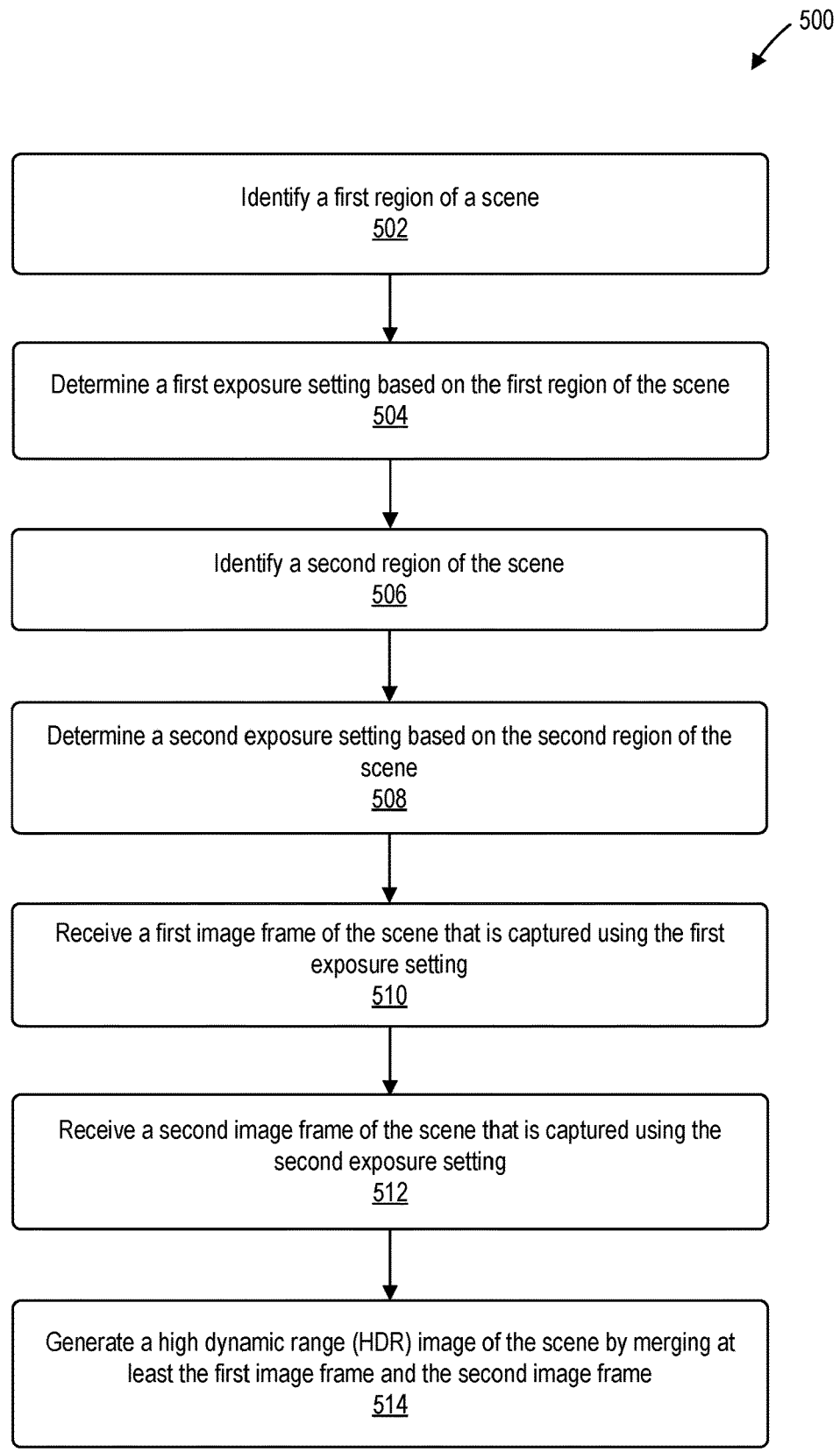
FIG. 5 is a flow diagram illustrating an example of a process for processing image data.

FIG. 5 is a flowchart illustrating an example of a process 500 of processing image data using the techniques described herein. At block 502, the process 500 includes identifying a first region of a scene. Block 502 may correspond to operation 215 of the operations 200. At block 504, the process 500 includes determining a first exposure setting based on the first region of the scene. Block 504 may correspond to operation 225 of the operations 200. At block 506, the process 500 includes identifying a second region of the scene. Block 504 may correspond to operation 220 of the operations 200. At block 508, the process 500 includes determining a second exposure setting based on the second region of the scene. Block 504 may correspond to operation 230 of the operations 200.

In some cases, the first and second regions are identified at blocks 502 and 506 based on inputs received from certain input devices. In one example, the process 500 may include receiving one or more touch-based inputs through a touchscreen while the touchscreen displays one or more preview frames of the scene. The one or more touchscreen inputs may be received through a touchscreen connector coupled to the touchscreen and to the image processor 150. Identifying the first region and the second region at blocks 502 and 506 is based on the one or more touch-based inputs. In another example, the process 500 may include receiving one or more pointer-based inputs through an input device that controls a pointer on a screen (e.g., a mouse or trackpad) while the screen displays one or more preview frames of the scene. The one or more pointer-based inputs may be received through an input device connector coupled to the input device and to the image processor 150. Identifying the first region and the second region at blocks 502 and 506 is based on the one or more pointer-based inputs.

In some cases, the first and second regions are identified at blocks 502 and 506 based on an algorithm. In one example, the process 500 includes identifying an object in the scene using an object detection algorithm. Identifying the first region of the scene at block 502 is based on identifying that the object is within the first region. Similarly, identifying the second region of the scene at block 506 can be based on identifying that a second object is within the second region using the object detection algorithm. In some cases, the object can be a face of a person. The second object can be a second face of a second person, or can be a different object.

In some cases, the first exposure setting corresponds to a first exposure time, and the second exposure setting corresponds to a second exposure time that is different from the first exposure time. In some cases, a mid-tone of the first region in the scene matches a mid-tone of a representation of the first region in the first image frame within a first threshold, and wherein a mid-tone of the second region in the scene matches a mid-tone of a representation of the first region in the second image frame within a second threshold.

In some cases, the first region includes all of the pixels of the first image frame. In other words, the first region includes the entire portion of the scene that is visible to the image sensor 130, that is received by the image processor 150 from the image sensor 130, or that results from one or more operations performed by the image processor 150.

At block 510, the process 500 includes receiving a first image frame of the scene that is captured using the first exposure setting. In some cases, block 506 may also include capturing the first image frame of the scene using the first exposure setting. Block 506 may correspond to operation 235 of the operations 200.

At block 512, the process 500 includes receiving a second image frame of the scene that is captured using the second exposure setting. In some cases, block 508 may also include capturing the second image frame of the scene using the second exposure setting. Block 508 may correspond to operation 240 of the operations 200.

In some cases, the first region is reproduced in the second image frame at a second contrast level and in the first image frame at a first contrast level that exceeds the second contrast level. In some cases, the second region is reproduced in the first image frame at a first contrast level and in the second image frame at a second contrast level that exceeds the first contrast level.

At block 514, the process 500 includes generating a high dynamic range (HDR) image of the scene by merging at least the first image frame and the second image frame. Block 510 may correspond to operation 250 of the operations 200.

In some cases, a third dynamic range of the HDR image is greater than at least one of a first dynamic range of the first image frame and a second dynamic range of the second image frame.

In some cases, the process 500 may also include identifying a third region of the scene, determining a third exposure setting based on a third region of the scene, and receiving a third image frame of the scene captured using the third exposure setting. Generating the HDR image of the scene at block 514, in this case, includes merging at least the first image frame and the second image frame and the third image frame.

In some cases, the process 500 may also include determining a third exposure setting and a fourth exposure setting using exposure bracketing based on the first exposure setting, receiving a third image frame of the scene captured using the third exposure setting, and receiving a fourth image frame of the scene captured using the fourth exposure setting. Generating the HDR image of the scene at block 514, in this case, includes merging at least the first image frame and the second image frame and the third image frame and the fourth image frame.

In some cases, the process 500 may also include determining a third exposure setting that is offset from the first exposure setting by a predetermined offset and receiving a third image frame of the scene captured using the third exposure setting. Generating the HDR image of the scene at block 514, in this case, includes merging at least the first image frame and the second image frame and the third image frame.

In some examples, the processes described herein (e.g., process 500 and/or other process described herein) may be performed by a computing device or apparatus. In one example, the process 500 can be performed by the image processing device 105B of FIG. 1. In another example, the process 500 can be performed by the image capture and processing device 100 of FIG. 1. In another example, the process 500 can be performed by a computing system 600 including the architecture shown in FIG. 6. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 500. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
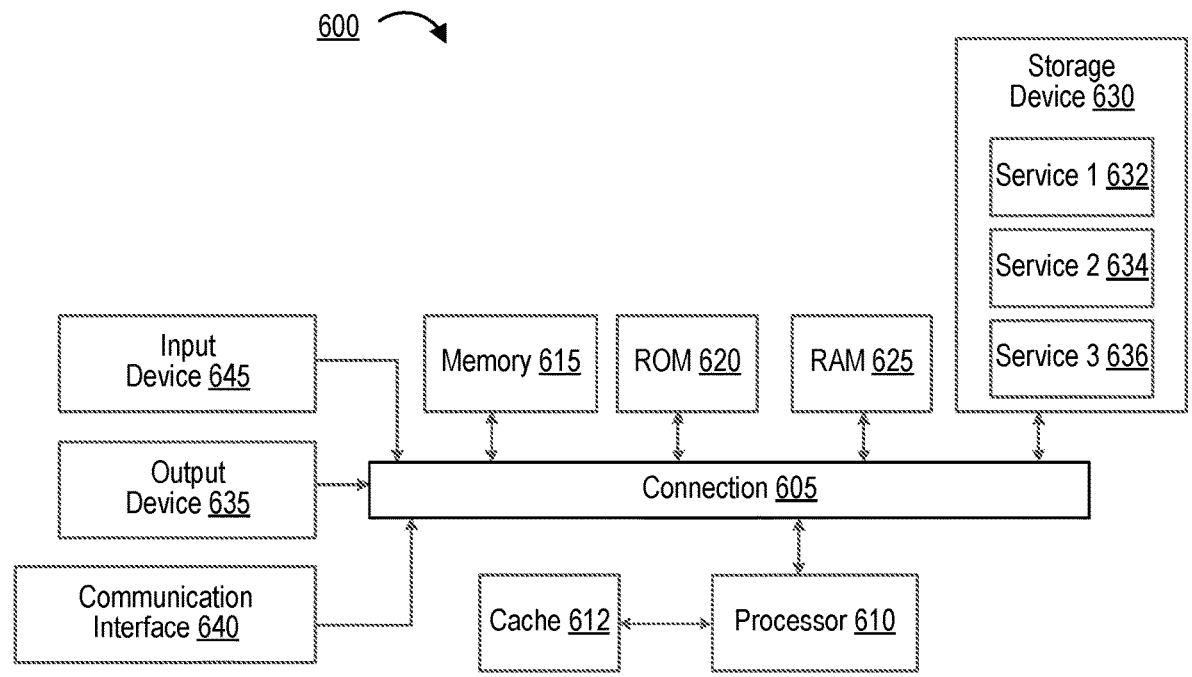
FIG. 6 is a diagram illustrating an example of a system for implementing certain aspects of the present technology.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the application are provided below:

Aspect 1. A method of processing image data, the method comprising: identifying a first region of a scene; determining a first exposure setting based on the first region of the scene; identifying a second region of the scene; determining a second exposure setting based on the second region of the scene; receiving a first image frame of the scene that is captured using the first exposure setting; receiving a second image frame of the scene that is captured using the second exposure setting; and generating a high dynamic range (HDR) image of the scene by merging at least the first image frame and the second image frame.

Aspect 2. The method of aspect 1, further comprising: receiving one or more touch-based inputs through a touchscreen while the touchscreen displays one or more preview frames of the scene, wherein identifying the first region and the second region is based on the one or more touch-based inputs.

Aspect 3. The method of any one of aspects 1 or 2, further comprising: receiving one or more pointer-based inputs through an input device that controls a pointer on a screen while the screen displays one or more preview frames of the scene, wherein identifying the first region and the second region is based on the one or more pointer-based inputs.

Aspect 4. The method of any one of aspects 1 to 3, further comprising: identifying an object in the scene using an object detection algorithm, wherein identifying the first region of the scene is based on identifying that the object is within the first region.

Aspect 5. The method of aspect 4, wherein the object is a face.

Aspect 6. The method of any one of aspects 1 to 5, further comprising: identifying a third region of the scene; determining a third exposure setting based on a third region of the scene; and receiving a third image frame of the scene captured using the third exposure setting, wherein generating the HDR image of the scene includes merging at least the first image frame and the second image frame and the third image frame.

Aspect 7. The method of any one of aspects 1 to 6, wherein the first exposure setting corresponds to a first exposure time and the second exposure setting corresponds to a second exposure time that is different from the first exposure time.

Aspect 8. The method of any one of aspects 1 to 7, wherein a mid-tone of the first region in the scene matches a mid-tone of a representation of the first region in the first image frame within a first threshold, and wherein a mid-tone of the second region in the scene matches a mid-tone of a representation of the first region in the second image frame within a second threshold.

Aspect 9. The method of any one of aspects 1 to 8, wherein the first region is reproduced in the second image frame at a second contrast level and in the first image frame at a first contrast level that exceeds the second contrast level.

Aspect 10. The method of any one of aspects 1 to 9, wherein the second region is reproduced in the first image frame at a first contrast level and in the second image frame at a second contrast level that exceeds the first contrast level.

Aspect 11. The method of any one of aspects 1 to 10, wherein a third dynamic range of the HDR image is greater than at least one of a first dynamic range of the first image frame and a second dynamic range of the second image frame.

Aspect 12. The method of any one of aspects 1 to 11, wherein the first region includes all pixels of the first image frame.

Aspect 13. The method of any one of aspects 1 to 12, further comprising: determining a third exposure setting and a fourth exposure setting using exposure bracketing based on the first exposure setting; receiving a third image frame of the scene captured using the third exposure setting; and receiving a fourth image frame of the scene captured using the fourth exposure setting, wherein generating the HDR image of the scene includes merging at least the first image frame and the second image frame and the third image frame and the fourth image frame.

Aspect 14. The method of any one of aspects 1 to 13, further comprising: determining a third exposure setting that is offset from the first exposure setting by a predetermined offset; and receiving a third image frame of the scene captured using the third exposure setting, wherein generating the HDR image of the scene includes merging at least the first image frame and the second image frame and the third image frame.

Aspect 15. The method of any one of aspects 1 to 14, further comprising: capturing the first image frame of the scene using the first exposure setting; and capturing the second image frame of the scene using the second exposure setting.

Aspect 16. An apparatus for processing image data, the apparatus comprising: a connector that is coupled to an image sensor, wherein the connector receives a first image frame of a scene that is captured using a first exposure setting and receives a second image frame of the scene that is captured using a second exposure setting; one or more memory units storing instructions; and one or more processors that execute the instructions, wherein execution of the instructions by the one or more processors causes the one or more processors to: identify a first region of the scene, determine the first exposure setting based on the first region of the scene, identify a second region of the scene, determine the second exposure setting based on the second region of the scene, and generate a high dynamic range (HDR) image of the scene by merging at least the first image frame and the second image frame.

Aspect 17. The apparatus of aspect 16, wherein the apparatus is a mobile device.

Aspect 18. The apparatus of any one of aspects 16 or 17, wherein the apparatus includes a display configured to display the HDR image.

Aspect 19. The apparatus of any one of aspects 16 to 18, wherein the apparatus is a camera.

Aspect 20. The apparatus of any one of aspects 16 to 19, further comprising a touchscreen connector that is coupled to a touchscreen, wherein the touchscreen connector receives one or more touch-based inputs from the touchscreen while the touchscreen displays one or more preview frames of the scene, wherein identifying the first region of the scene and identifying the second region of the scene are based on the one or more touch-based inputs.

Aspect 21. The apparatus of any one of aspects 16 to 20, further comprising an input device connector that is coupled to an input device that controls a pointer on a screen, wherein the input device connector receiving one or more pointer-based inputs from the input device while the screen displays one or more preview frames of the scene, wherein identifying the first region of the scene and identifying the second region of the scene are based on the one or more pointer-based inputs.

Aspect 22. The apparatus of any one of aspects 16 to 21, wherein execution of the instructions by the one or more processors causes the one or more processors to further identify an object in the scene using an object detection algorithm, wherein identifying the first region of the scene is based on identifying that the object is within the first region.

Aspect 23. The apparatus of aspect 22, wherein execution of the instructions by the one or more processors causes the one or more processors to further: identify a third region of the scene, determine a third exposure setting based on a third region of the scene, and receive a third image frame of the scene captured using the third exposure setting, wherein generating the HDR image of the scene includes merging at least the first image frame and the second image frame and the third image frame.

Aspect 24. The apparatus of any one of aspects 16 to 23, wherein the first exposure setting corresponds to a first exposure time and the second exposure setting corresponds to a second exposure time that is different from the first exposure time.

Aspect 25. The apparatus of any one of aspects 16 to 24, wherein a mid-tone of the first region in the scene matches a mid-tone of a representation of the first region in the first image frame within a first threshold, and wherein a mid-tone of the second region in the scene matches a mid-tone of a representation of the first region in the second image frame within a second threshold.

Aspect 26. The apparatus of any one of aspects 16 to 25, wherein the first region includes all pixels of the first image frame.

Aspect 27. The apparatus of any one of aspects 16 to 26, wherein execution of the instructions by the one or more processors causes the one or more processors to further: determine a third exposure setting and a fourth exposure setting using exposure bracketing based on the first exposure setting, receive a third image frame of the scene captured using the third exposure setting, and receive a fourth image frame of the scene captured using the fourth exposure setting, wherein generating the HDR image of the scene includes merging at least the first image frame and the second image frame and the third image frame and the fourth image frame.

Aspect 28. The apparatus of any one of aspects 16 to 27, wherein execution of the instructions by the one or more processors causes the one or more processors to further: determine a third exposure setting that is offset from the first exposure setting by a predetermined offset, and receive a third image frame of the scene captured using the third exposure setting, wherein generating the HDR image of the scene includes merging at least the first image frame and the second image frame and the third image frame.

Aspect 29. The apparatus of any one of aspects 16 to 28, further comprising the image sensor, wherein the image sensor is configured to capture the first image frame of the scene using the first exposure setting and is configured to capture the second image frame of the scene using the second exposure setting.

Aspect 30. A non-transitory computer readable storage medium having embodied thereon a program, wherein the program is executable by a processor to perform any of the operations of aspects 1 to 29.

Aspect 31. An apparatus comprising means for performing any of the operations of aspects 1 to 29.

What is claimed is:

1. A method of processing image data, the method comprising:
    applying an object detection algorithm to image data of a scene to identify a first object in a first region of a scene and to identify a second object in a second region of the scene;
    determining a first exposure setting using a first auto-exposure process based on the first object in the scene;
    determining a second exposure setting using a second auto-exposure process based on the second object in the scene;
    receiving a first image frame of the scene, the first image frame captured using the first exposure setting;
    receiving a second image frame of the scene, the second image frame captured using the second exposure setting; and
    generating a high dynamic range (HDR) image of the scene by merging at least the first image frame and the second image frame.

2. The method of claim 1, further comprising:
    receiving one or more touch-based inputs through a touchscreen while the touchscreen displays one or more preview frames of the scene that are based on the image data, wherein the one or more touch-based inputs indicate a selection of the first object and the second object.

3. The method of claim 1, further comprising:
    receiving one or more pointer-based inputs through an input device that controls a pointer on a screen while the screen displays one or more preview frames of the scene that are based on the image data, wherein the one or more pointer-based inputs indicate a selection of the first object and the second object.

4. The method of claim 1, further comprising:
    identifying one or more features of the first object using a feature detection algorithm, wherein the in the scene using an object detection algorithm identifies the first object based on the one or more features.

5. The method of claim1, wherein the first object is a face.

6. The method of claim 1, further comprising:
    identifying a third region of the scene;
    determining a third exposure setting based on a third region of the scene; and
    receiving a third image frame of the scene captured using the third exposure setting, wherein generating the HDR image of the scene includes merging at least the first image frame and the second image frame and the third image frame.

7. The method of claim 1, wherein the first exposure setting corresponds to a first exposure time and the second exposure setting corresponds to a second exposure time that is different from the first exposure time.

8. The method of claim 1, wherein a mid-tone of the first region in the scene matches a mid-tone of a representation of the first region in the first image frame within a first threshold, and wherein a mid-tone of the second region in the scene matches a mid-tone of a representation of the first region in the second image frame within a second threshold.

9. The method of claim 1, wherein the first region is reproduced in the second image frame at a second contrast level and in the first image frame at a first contrast level that exceeds the second contrast level.

10. The method of claim 1, wherein the second region is reproduced in the first image frame at a first contrast level and in the second image frame at a second contrast level that exceeds the first contrast level.

11. The method of claim 1, wherein a third dynamic range of the HDR image is greater than at least one of a first dynamic range of the first image frame and a second dynamic range of the second image frame.

12. The method of claim 1, wherein the first region includes all pixels of the first image frame.

13. The method of claim 1, further comprising:
determining a third exposure setting and a fourth exposure setting using exposure bracketing based on the first exposure setting;
receiving a third image frame of the scene captured using the third exposure setting; and
receiving a fourth image frame of the scene captured using the fourth exposure setting, wherein generating the HDR image of the scene includes merging at least the first image frame and the second image frame and the third image frame and the fourth image frame.

14. The method of claim 1, further comprising:
determining a third exposure setting that is offset from the first exposure setting by a predetermined offset; and
receiving a third image frame of the scene captured using the third exposure setting, wherein generating the HDR image of the scene includes merging at least the first image frame and the second image frame and the third image frame.

15. The method of claim 1, further comprising:
capturing the first image frame of the scene using the first exposure setting; and
capturing the second image frame of the scene using the second exposure setting.

16. An apparatus for processing image data, the apparatus comprising:
a connector that is coupled to an image sensor, wherein the connector receives a first image frame of a scene and a second image frame of the scene, the first image frame captured using a first exposure setting, the second image frame captured using a second exposure setting;
one or more memory units storing instructions; and
one or more processors that execute the instructions, wherein execution of the instructions by the one or more processors causes the one or more processors to:
applying an object detection algorithm to image data of a scene to identify a first object in a first region of the scene and to identify a second object in a second region of the scene,
determine the first exposure setting using a first auto-exposure process based on the first object in the scene,
determine the second exposure setting using a second auto-exposure process based on the second object in the scene, and
generate a high dynamic range (HDR) image of the scene by merging at least the first image frame and the second image frame.

17. The apparatus of claim 16, wherein the apparatus is a mobile device.

18. The apparatus of claim 16, wherein the apparatus includes a display configured to display the HDR image.

19. The apparatus of claim 16, wherein the apparatus is a camera.

20. The apparatus of claim 16, further comprising a touchscreen connector that is coupled to a touchscreen, wherein the touchscreen connector receives one or more touch-based inputs from the touchscreen while the touchscreen displays one or more preview frames of the scene that are based on the image data, wherein the one or more touch-based inputs indicate a selection of the first object and the second object.

21. The apparatus of claim 16, further comprising an input device connector that is coupled to an input device that controls a pointer on a screen, wherein the input device connector receiving one or more pointer-based inputs from the input device while the screen displays one or more preview frames of the scene that are based on the image data, wherein the one or more pointer-based inputs indicate a selection of the first object and the second object.

22. The apparatus of claim 16, wherein the execution of the instructions by the one or more processors causes the one or more processors to further identify one or more features of the first object using a feature detection algorithm, wherein the object detection algorithm identifies the first object based on the one or more features.

23. The apparatus of claim 22, wherein the execution of the instructions by the one or more processors causes the one or more processors to further:
identify a third region of the scene,
determine a third exposure setting based on a third region of the scene, and
receive a third image frame of the scene captured using the third exposure setting, wherein generating the HDR image of the scene includes merging at least the first image frame and the second image frame and the third image frame.

24. The apparatus of claim 16, wherein the first exposure setting corresponds to a first exposure time and the second exposure setting corresponds to a second exposure time that is different from the first exposure time.

25. The apparatus of claim 16, wherein a mid-tone of the first region in the scene matches a mid-tone of a representation of the first region in the first image frame within a first threshold, and wherein a mid-tone of the second region in the scene matches a mid-tone of a representation of the first region in the second image frame within a second threshold.

26. The apparatus of claim 16, wherein the first region includes all pixels of the first image frame.

27. The apparatus of claim 16, wherein the_execution of the instructions by the one or more processors causes the one or more processors to further:
determine a third exposure setting and a fourth exposure setting using exposure bracketing based on the first exposure setting,
receive a third image frame of the scene captured using the third exposure setting, and
receive a fourth image frame of the scene captured using the fourth exposure setting, wherein generating the HDR image of the scene includes merging at least the first image frame and the second image frame and the third image frame and the fourth image frame.

28. The apparatus of claim 16, wherein the execution of the instructions by the one or more processors causes the one or more processors to further:
determine a third exposure setting that is offset from the first exposure setting by a predetermined offset, and
receive a third image frame of the scene captured using the third exposure setting, wherein generating the HDR image of the scene includes merging at least the first image frame and the second image frame and the third image frame.

29. The apparatus of claim 16, further comprising the image sensor, wherein the image sensor captures the first image frame of the scene using the first exposure setting and captures the second image frame of the scene using the second exposure setting.

30. A non-transitory computer readable storage medium having embodied thereon a program, wherein the program is executable by a processor to perform a method of processing image data, the method comprising:
- applying an object detection algorithm to image data of a scene to identify a first object in a first region of a scene and to identify a second object in a second region of the scene;
- determining a first exposure setting using a first auto-exposure process based on the first object in the scene;
- determining a second exposure setting using a second auto-exposure process based on the second object in the scene;
- receiving a first image frame of the scene, the first image frame captured using the first exposure setting;
- receiving a second image frame of the scene, the second image frame captured using the second exposure setting; and
- generating a high dynamic range (HDR) image of the scene by merging at least the first image frame and the second image frame.

\* \* \* \* \*